US009906050B2

(12) United States Patent
Seiler et al.

(10) Patent No.: US 9,906,050 B2
(45) Date of Patent: Feb. 27, 2018

(54) METHOD FOR SETTING PARAMETERS OF A FIELD DEVICE ELECTRICAL CURRENT SUPPLY MODULE

(75) Inventors: Christian Seiler, Auggen (DE); Marc Fiedler, Reinach (CH); Stefan Probst, Weil am Rhein (DE)

(73) Assignee: Endress + Hauser Process Solutions AG, Reinach (CH)

( * ) Notice: Subject to any disclaimer, the term of this patent is extended or adjusted under 35 U.S.C. 154(b) by 1327 days.

(21) Appl. No.: 13/513,304

(22) PCT Filed: Nov. 9, 2010

(86) PCT No.: PCT/EP2010/067147
§ 371 (c)(1),
(2), (4) Date: Jun. 1, 2012

(87) PCT Pub. No.: WO2011/067081
PCT Pub. Date: Jun. 9, 2011

(65) Prior Publication Data
US 2012/0235479 A1 Sep. 20, 2012

(30) Foreign Application Priority Data
Dec. 4, 2009 (DE) .................. 10 2009 047 544

(51) Int. Cl.
*H02J 17/00* (2006.01)
*H02J 7/00* (2006.01)
*G05B 19/042* (2006.01)

(52) U.S. Cl.
CPC .......... *H02J 7/0004* (2013.01); *G05B 19/042* (2013.01); *G05B 2219/25101* (2013.01);
(Continued)

(58) Field of Classification Search
CPC ....................................................... H02J 17/00
(Continued)

(56) References Cited

U.S. PATENT DOCUMENTS 6,487,509 B1 * 11/2002 Aisa .......................... H02J 3/14
702/60
7,474,929 B2 * 1/2009 Nixon .................. G05B 19/042
700/275

(Continued)

FOREIGN PATENT DOCUMENTS

CN   100409563 C   8/2008
DE    60006018 T2   12/2004

(Continued)

OTHER PUBLICATIONS

German Search Report in corresponding German Application No. 10 2009 047 544.3, dated Aug. 24, 2010.

(Continued)

*Primary Examiner* — Jared Fureman
*Assistant Examiner* — Emmanuel R Dominique
(74) *Attorney, Agent, or Firm* — Bacon & Thomas, PLLC

(57) ABSTRACT

A method for setting energy supply parameters of a field device electrical current supply module. The field device electrical current supply module is connected, in such case, exclusively to one field device. The connected field device can be supplied electrical energy by the field device electrical current supply module. In the method, a field device type of the connected field device is identified first by the field device electrical current supply module. Then, a parameter setting of at least one energy supply parameter of the field device electrical current supply module is automatically read out from a database and this is loaded into the field device electrical current supply module.

15 Claims, 3 Drawing Sheets

(52) U.S. Cl.
CPC ........... *G05B 2219/25282* (2013.01); *G05B 2219/25325* (2013.01); *Y10T 307/25* (2015.04)

(58) Field of Classification Search
USPC .................................................. 307/11, 154
See application file for complete search history.

(56) References Cited

U.S. PATENT DOCUMENTS

| | | | | |
|---|---|---|---|---|
| 7,983,229 | B2* | 7/2011 | Bachmann | H04L 63/0272 370/338 |
| 8,035,368 | B2* | 10/2011 | May | G06F 1/266 323/318 |
| 8,217,639 | B2* | 7/2012 | Sip | H02J 7/04 323/318 |
| 8,452,255 | B2* | 5/2013 | Orth | G01D 21/00 323/220 |
| 2002/0048369 | A1* | 4/2002 | Ginter | G06F 21/10 380/277 |
| 2002/0083364 | A1* | 6/2002 | Christensen | G06F 11/2005 714/13 |
| 2003/0052547 | A1* | 3/2003 | Fischer | H01R 13/6675 307/154 |
| 2003/0105546 | A1* | 6/2003 | Robinson | G01N 15/10 700/117 |
| 2005/0096872 | A1* | 5/2005 | Blevins | G05B 17/02 702/183 |
| 2005/0171645 | A1* | 8/2005 | Oswald | G05B 15/02 700/276 |
| 2005/0222698 | A1* | 10/2005 | Eryurek | G06F 8/34 700/90 |
| 2006/0116102 | A1* | 6/2006 | Brown | G05B 19/4185 455/343.1 |
| 2009/0322347 | A1* | 12/2009 | Hashimshony | G01R 27/32 324/601 |
| 2010/0201342 | A1* | 8/2010 | Thoren | G05B 19/042 323/318 |
| 2010/0305721 | A1* | 12/2010 | Kostadinov | G05B 19/0426 700/87 |

FOREIGN PATENT DOCUMENTS

| | | |
|---|---|---|
| DE | 102004029022 A1 | 2/2005 |
| DE | 102007054923 A1 | 5/2009 |
| EP | 1045302 A1 | 10/2000 |
| GB | 2403043 A | 12/2004 |
| WO | 2005/103851 A1 | 11/2005 |
| WO | 2009/063053 A1 | 5/2009 |

OTHER PUBLICATIONS

International Search Report in corresponding PCT Application No. PCT/EP2010/067147, dated Aug. 26, 2011.
International Preliminary Report on Patentability and Written Opinion in corresponding PCT Application No. PCT/EP2010/067147, dated Jun. 14, 2012.
Schneider Electric: "Plant Struxure—Process Automation System", Oct. 2009, XP-002656938, retrieved from the Internet: http:/www.google.nl/url?q=http://download.schneider-electric.nu/snb/download.

* cited by examiner

METHOD FOR SETTING PARAMETERS OF A FIELD DEVICE ELECTRICAL CURRENT SUPPLY MODULE

TECHNICAL FIELD

The present invention relates to a method for setting energy supply parameters of a field device electrical current supply module. The field device electrical current supply module is, in such case, connected exclusively to one field device. The field device electrical current supply module has an electrical energy source or is connected to such. By the field device electrical current supply module, the one connected field device is suppliable with electrical energy.

BACKGROUND DISCUSSION

In process automation technology, field devices are often applied, which serve for registering and/or influencing process variables. Serving for registering process variables sensors are, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity, respectively. Serving for influencing process variables are actuators, such as, for example, valves or pumps, via which the flow of a liquid in a pipeline section or the fill level in a container can be changed. Such sensors and actuators are especially referred to as field devices. A large number of such field devices are available from the firm Endress+Hauser.

In modern industrial plants, field devices are, as a rule, connected via bus systems (Profibus®, Foundation® Fieldbus, HART®, etc.) with superordinated units. Normally, the superordinated units are control systems, or control units, such as, for example, PLCs (programmable logic controllers). The superordinated units serve, among other things, for process control, process visualizing, process monitoring as well as for start-up of the field devices. The measured values registered by the field devices, especially sensors, are transmitted via the particular bus system to one or, in given cases, a number of superordinated unit(s). Along with that, also a data transmission from the superordinated unit via the bus system to the field devices is required, especially for configuring and parametering field devices as well as for operating actuators.

Besides a wired data transmission between the field devices and a superordinated unit, there is also the opportunity for wireless, e.g. radio, data transmission. For implementing wireless data transmission, newer field devices are partially embodied as radio-field devices. These have, as a rule, a radio unit as an integral component. Furthermore, they can also have an integrated electrical current source, such as, for example, a single-use battery, so that they are operable as autarkic units.

Along with that, there is the opportunity for upgrading field devices without radio units (i.e. with only a wired communication interface) and without their own electrical current source by connection of a wireless adapter, which has a radio unit, so that they become radio-capable field devices. For example, in the publication WO 2005/103851 A1, a wireless adapter is described. In such case, a wireless adapter is preferably embodied in such a manner that it also enables an energy supply (or electrical current supply) of the connected field device. In such case, the wireless adapter forms simultaneously a field device electrical current supply module.

Similarly as in a field device, also in a wireless adapter, a plurality of parameters are provided. In part, these are preset by the manufacturer of the wireless adapter and/or they can be set by a user, especially changed, activated and/or deactivated. The parameters of the wireless adapter are, as a rule, stored in a memory of the wireless adapter. In this way, a corresponding control unit of the wireless adapter (e.g. a microprocessor) can access these parameter and operate the wireless adapter in correspondence with the parameter settings. Through the respective parameter settings, in such case, the manner of operation of the wireless adapter is determined.

In case the wireless adapter also can provide an energy supply (or electrical current supply) of the connected field device, i.e. the wireless adapter is also embodied as a field device electrical current supply module, then also provided in the wireless adapter are corresponding parameters, which can be set regarding the energy supply (or electrical current supply) of the field device. These parameter are referred to in the following as energy supply-parameters of the wireless adapter. Energy supply-parameter of the wireless adapter are, for example, a start-up voltage, which is provided by the wireless adapter to the connected field device during a start-up phase, and an operating voltage, which is provided to the field device by the wireless adapter after the start-up phase. As a function of the field device type connected to the wireless adapter, there are different requirements relative to the energy supply by the wireless adapter.

In such case, there has been previously the opportunity to use for the energy supply parameters of the wireless adapter so called default parameter settings (standard parameter settings, which also can be already preset), which are applicable for a number of field device types. Such default parameter settings, however, do not, as a rule, enable optimal energy supply of the respectively connected field device type. This can mean, especially, an increased energy consumption and/or a longer time period, until a valid measured value is delivered by the field device.

Furthermore, there is the possibility that the setting of the energy supply parameters is performed by a user. The user uses, for this, especially, corresponding configuration tools. Also here, there arises the problem that the user, first of all, must ascertain the parameter settings of the energy supply parameters optimal for the respectively connected field device type (for example, by looking in the manual of the respective field device, etc.) and must then input such into the wireless adapter. For this, there is for the user a relatively high effort required. Also, the danger that errors can occur is relatively large.

SUMMARY OF THE INVENTION

Accordingly, an object of the present invention is to provide a method, which enables in the case of a field device electrical current supply module, especially in the case of a wireless adapter, in simple and reliable manner, the setting of suitable energy supply parameters of the field device electrical current supply module, in each case, for a connected field device type.

The present invention provides a method for setting energy supply parameters of a field device electrical current supply module. The field device electrical current supply module is, in such case, connected exclusively to one field device (especially to a sensor or to an actuator). Furthermore, the field device electrical current supply module includes an electrical energy source or it is connected to such and the connected field device is suppliable by the field device electrical current supply module with electrical energy (or electrical power). The method of the invention includes, in such case, steps as follows:

A) Identifying a field device type of the connected field device by the field device electrical current supply module; and B) automatically reading out a parameter setting of at least one energy supply parameter of the field device electrical current supply module from a database and loading such into the field device electrical current supply module, wherein the read out parameter setting is specific to the identified field device type, wherein the at least one energy supply parameter relates to energy supply (especially electrical current supply) of the field device by the field device electrical current supply module and wherein stored in the database are parameter settings for at least one energy supply parameter for a plurality of field device types.

In a database, suitable parameter settings of energy supply parameters can be managed and, in given cases, updated, in simple manner, for different field device types. Since, in the case of setting energy supply parameters, the database is accessed and the parameter settings suitable for the identified field device type are read out automatically from the database, it is assured that correct parameter settings of energy supply parameters are present in the field device electrical current supply module. In comparison with manual input by a user, there is, in such case, not the danger that the wrong parameter settings (for example, for another field device type) are ascertained or that erroneous parameter settings are input. Accordingly, errors during operation of the field device caused by defective settings of the energy supply parameters are prevented, and/or increased energy consumption of the field device caused by a non optimal setting of energy supply parameters are avoided. Furthermore, the effort required of the user for setting the energy supply parameters is reduced.

The field device electrical current supply module need not absolutely be embodied as a wireless adapter. Rather, it can be, in general, a module, which is embodied for connection to a (single) field device and through which the one connected field device is suppliable with electrical energy (or electrical power). For example, instead of the previously frequently provided, direct connection of a field device to the grid current, it can also be provided that it is connected via a field device electrical current supply module of the invention to the grid current or even to another energy source, which can be embodied externally of and/or internally in, the field device electrical current supply module. Thus, the field device electrical current supply module can supply the field device with electrical energy. In this way, the electrical current supply can be optimally matched to the respective field device type. In this way, consumption of electrical energy can be reduced. Besides electrical current supply of the connected field device, the field device electrical current supply module can also perform yet other functions.

In a field device electrical current supply module, there are, in such case, in corresponding manner, as explained above in reference to a wireless adapter, parameters provided, by which a manner of operation of the field device electrical current supply module can be set. The parameter are, in such case, especially stored in a memory of the field device electrical current supply module, so that a control unit of the field device electrical current supply module (e.g. a microprocessor) can access these parameter and can operate the field device electrical current supply module in correspondence with the parameter settings. Especially, energy supply parameters are provided in the field device electrical current supply module, wherein, by the setting of the energy supply parameters, the properties, or characterizing variables, of the energy supply (or electrical current supply) provided by the field device electrical current supply module are adjustable.

The setting of parameters is sometimes also referred to as parametering or configuring. In corresponding manner, as is known in the case of field devices, also in the case of a field device electrical current supply module, different access opportunities for setting parameters of the same can be provided. Especially, parameters of the field device electrical current supply module can be set via a service unit (also, in given cases, a display- and service unit) integrated in the field device electrical current supply module. Additionally, or alternatively, also a (or, in given cases, also a number of) configuration unit embodied separately from the field device electrical current supply module can be applied, in which a corresponding configuration tool is implemented. Such a configuration tool (e.g. the FieldCare® product of Endress+Hauser) offers, in such case, as a rule, more extensive functionalities than a display- and service unit integrated in the field device electrical current supply module, such as, for example, more display options, status displays, evaluation options, a graphical user interface with corresponding menu guidance, etc. Especially, such a configuration tool provides, as a rule, a graphical user interface with a corresponding menu guidance, which facilitates and makes clearer the setting of parameters. The configuration unit, on which the configuration tool is implemented, can be formed, for example, by a computer, which is connected (for example, via a HART®-modem) directly with the field device electrical current supply module. If the field device electrical current supply module is simultaneously also embodied as a wireless adapter, then the configuration unit can also operate wirelessly for setting parameters, for example, via a (wireless) fieldbus (and, in given cases, supplementally also via a network superordinated to the fieldbus), which is associated with the wireless adapter, or also, in general, (depending on the type of wireless adapter) via a radio connection (e.g. via GSM (Global System for Mobile Communications), via Bluetooth, via wireless LAN (wireless Local Area Network), etc. In such case, the configuration tool can even be implemented in a unit, which fulfills in the plant yet other tasks, such as, for example, process control, plant asset management, visualization tasks, process monitoring, etc. This unit provides then simultaneously a configuration unit. Furthermore, a configuration unit can also be formed by a handheld servicing device. Such a servicing device is, as a rule, connected to a corresponding service-interface of the field device electrical current supply module.

The field device electrical current supply module is, in such case, connected to exclusively one field device. Especially, it is not embodied for energy supply of a plurality of parallel connected field devices. Accordingly, the energy supply parameters can be set specially for the respectively connected field device type, so that its energy supply is optimized. Preferably, the field device electrical current supply module is connected releasably to a field device. In this way, it is connectable, in simple manner, to different field devices, especially even to different field device types.

Where it is stated that some steps of the method are performed "automatically", this means that such are executed without human intervention, especially by soft- and/or hardware.

As already explained above, the energy supply parameters concern energy supply of the field device by the field device electrical current supply module. Especially, via these, the energy (especially electrical power) provided by the field device electrical current supply module can be matched to a power requirement of the respectively connected field device and, in given cases, even to different operating phases of the field device. Examples for energy supply parameters include, among other things, electrical current values, voltage values and/or time periods (over which, for example, a certain voltage value is to be provided), etc.

As explained above, the required parameter settings for the energy supply parameters differ, as a rule, depending on the connected field device type. In the database, in such case, a number of parameter settings (or parameter values) for each energy supply parameter are stored, wherein a parameter setting is, in each case, specific to an (associated) field device type. In the step of the automatic reading out, the parameter setting of the at least one energy supply parameter specific to the identified field device type is accordingly read out. In such case, there is the possibility to group a number of different field devices, which have identical requirements relative to the electrical current supply (and accordingly have identical parameter settings of the energy supply parameters), as one field device type in the database. Furthermore, the parameter settings of the energy supply parameters in the field device electrical current supply module can also be performed for the case that the field device should not be first supplied with energy by the field device electrical current supply module. To the extent that the field device should be supplied with energy by the field device electrical current supply module at a later point in time, the correct parameter settings are already present.

In a further development, the field device electrical current supply module is formed by a wireless adapter, by which a wireless signal transmission for the connected field device is feasible. In this way, a conventional field device can be upgraded to a radio field device and simultaneously be operated in an energy saving manner. In such case, it can be provided that all communication for the field device is performed wirelessly via the wireless adapter. This, however, is not imperative. Rather, it can also be provided that a part of the communication occurs via a wired connection. For example, in the case of a HART® field device, it can be provided that a measured value is transmitted analogly via a wired communication connection according to the 4-20 mA standard. Additionally, via a connected wireless adapter, a measured value, a control command, further diagnostic information, etc., can be transmitted wirelessly via radio. Furthermore, information of the field device (measured values, diagnostic information, status information, etc.) can be transmitted over radio via a wireless adapter to a separately embodied unit, which is embodied for a corresponding wireless communication and which, in reference to the particular process, executes process control, process monitoring, plant asset management and/or visualization tasks, etc., and telegrams are received by such a unit.

The wireless adapter can especially be embodied in such a manner that it is a communication participant of a radio network according to the standard IEEE 802.15.4. The radio network can be embodied, furthermore, according to the wireless HART® standard or the ISA100 standard, which, in each case, are built upon the standard IEEE 802.15.4. In the case of the said radio networks, as a rule, the wireless adapter has a gateway, which enables communication with a superordinated network (superordinated to the radio network), such as, for example, a wired fieldbus, a company network (e.g. an Ethernet® network), the Internet and/or communication via GSM), etc. For example, a superordinated unit, which performs process control, a plant asset management system, a visualization system, etc. can be connected to the superordinated network, so that communication is enabled between this superordinated unit and the field device (via the gateway and the wireless adapter). As an alternative to the standardized radio networks named above, however, other radio networks can be applied. Additionally, or alternatively, the wireless adapter can also be embodied in such a manner that it enables direct wireless communication (for example, via GSM, Bluetooth, wireless LAN, etc.). In this way, it can wirelessly communicate directly with a communication unit (e.g. a superordinated unit, which performs process control, a plant asset management system, a visualization system, a vendor asset management system, etc.), which, for example, requires a transmitted measured value or sends control commands for the wireless adapter.

In an advantageous further development, the field device electrical current supply module includes at least one autarkic electrical current source. In this way, the system comprising the field device and the field device electrical current supply module is operable decoupled from a grid current. If the field device electrical current supply module is simultaneously embodied as a wireless adapter, then the system comprising the field device and wireless adapter can be operated completely autarkically (i.e. without connection to an external electrical current grid and without wired connection to a fieldbus or network). This is especially advantageous in the case of locations of use in a process that are exposed, difficult to access and/or experience extreme conditions. The field device electrical current supply module can include especially a single-use battery, a rechargeable battery and/or a solar cell.

In an advantageous further development, the database is provided in a communication unit in communication with the field device electrical current supply module. Accordingly, the particular parameter setting can be read out in the step of reading out from the database in the communication unit and can be loaded into the field device electrical current supply module via the communication connection. Communication can occur, in such case, via a wired connection and/or via radio. In such case, the communication unit can, for example, be a unit, which forms a part of the plant of the plant operator, such as, for example, a superordinated unit, which performs process control (in reference to field devices associated with it), a plant asset management system (also referred to as a PAM system), a visualization system, a gateway (see a further development below), etc. The communication unit, in such case, can simultaneously form a server.

Furthermore, the communication unit can also be formed by an external server (having a corresponding database), which is not provided in the plant of the plant operator but is provided and updated by a manufacturer (of the field device electrical current supply module). Such an external server provided by a manufacturer can also simultaneously form a vendor asset management system. In such vendor asset management systems, information for field devices and/or other devices, such as, for example, a field device electrical current supply module, is centrally provided by the manufacturer of such in a database. Access to the database is most often enabled by corresponding portal pages having password protected logins. One such vendor asset management system, for example, is provided by Endress+Hauser through the "Web-enabled Asset Management System W@M". The accessing of such an external server provided by the manufacturer (in order especially to read out the respective parameter settings) can occur, in such case, for example, from a communication unit of the plant, such as, for example, a plant asset management system (PAM system). As explained above, the parameter settings can then be loaded into the field device electrical current supply module wirelessly and/or via a wired connection (depending on the construction and structure of the plant network). If the field device electrical current supply module is embodied as a wireless adapter, the possibility supplementally exists that this wireless adapter communicates directly with the external server provided by the manufacturer wirelessly (or via radio), such as, for example, via GSM, etc.

In a further development, the field device electrical current supply module is embodied as a wireless adapter and the database is provided in a gateway. The gateway, in such case, is in communication with the field device electrical current supply module via a wireless (or radio) connection and enables communication with a superordinated network and/or a superordinated computer unit. The provision of the database in the gateway is therefore, among other reasons, advantageous since a number of wireless adapters can access the database in a simple manner. "superordinated", in such case, refers to a network or computer unit, which is superordinated in reference to the network structure. In given cases, protocol conversion can also occur via the gateway.

In a further development, the field device electrical current supply module includes the database. In this way, all information required for setting the energy supply parameters is contained in the field device electrical current supply module and there is no dependence on external systems. The loading of the parameter settings (from the database) can occur, in such case, directly in the field device electrical current supply module.

In a further development, the step of the automatic reading out of the parameter setting of at least one energy supply parameter of the field device electrical current supply module from the database is performed by the field device electrical current supply module. The step of loading the parameter setting read out can also occur automatically via the field device electrical current supply module. However, it can also be provided that the read out parameter setting is first provided to a user (e.g. through a display on a corresponding display unit) and the loading is automatically performed (via the field device electrical current supply module) after confirmation by the user.

In a further development, the database is provided in a configuration unit, through which parameters of the field device electrical current supply module can be set. In such case, a unit, in which a corresponding configuration tool (for example, the FieldCare® product of Endress+Hauser) is implemented, is referred to as a configuration unit. In reference to communication between the configuration unit and the field device electrical current supply module, depending on the form and construction of the network structure and the communication participants involved, a number of options for communication exist, as was explained above.

In this further development, the database can have especially information for device integration of the field device electrical current supply module, such as, for example, a device description and/or a device driver of the field device electrical current supply module. Such information for device integration is applied in the case of field devices and can also be applied in corresponding manner in the case of a wireless adapter or generally in the case of a field device electrical current supply module, in order to enable a setting of parameters or generally also an operating of the same via a configuration tool. "Information for device integration" of a device generally describes the properties of the device, which properties are relevant to operating the same device. Information for device integration of the field device electrical current supply module, in such case, can especially include information required for setting parameters of the same field device electrical current supply module. Information for device integration of the field device electrical current supply module can include, for example, a device description (DD). The device description, as a rule, is created in textual form (e.g. in the ASCII text format). The information provided in the device description, as a rule, is interpreted or translated by an interpreter and provided to the configuration tool, which forms a frame application for the device description. Furthermore, information for device integration of the field device electrical current supply module can also be formed by a device driver of the field device, especially a "Device Type Manager" (DTM). A device driver, especially a "Device Type Manager", in such case, is device specific software, which encapsulates data and functions of the field device electrical current supply module and provides graphic operating elements. Such a device driver requires a corresponding frame application for execution, for example, a "Device Type Manager" requires for its execution an FDT frame application (FDT: Field Device Tool). A configuration tool, which forms such a FDT frame application, is, for example, the "FieldCare®" product of Endress+Hauser.

In a further development, the database is provided in a communication unit in communication with the configuration unit. A communication unit in communication with the configuration unit, as was explained above in reference to a communication unit in communication with the field device electrical current supply module, can be formed in corresponding manner by a communication unit provided internally in the plant (for example, a plant asset management system, etc.) and/or by a communication unit external to the plant (for example, a vendor asset management system). Accordingly, the particular parameter setting can be read out from the database in the communication unit in the step of reading out and be loaded into the field device electrical current supply module via the configuration unit. The communication (for loading the parameter setting) can occur, in such case, via a wired and/or a wireless connection.

With the provision of the database in the configuration unit and/or in a communication unit in connection with the configuration unit, the step of automatic reading out is initiated by the configuration unit. Furthermore, the step of loading the read out parameter setting by the configuration unit can also occur automatically. However, it can also be provided that the read out parameter setting is first provided to a user (e.g. via a display in the configuration unit) and the loading is performed automatically (via the configuration unit) after confirmation by the user.

In a further development, a database, in which parameter settings of at least one energy supply parameter for a number of field device types are stored, is provided centrally in a server and at least one database provided a) in the field device electrical current supply module,
b) in a communication unit, which is in communication with the field device electrical current supply module, c) in a configuration unit, through which parameters of the field device electrical current supply module can be set, and/or d) in a communication unit, which is in communication with the configuration unit, is updated by accessing the database provided in the server. Accordingly, the database centrally provided in a server can be managed and updated in a simple manner. Other databases, which are provided in a plant of the plant operator (e.g. according to one or more of the variants a) through d)), can then be updated by accessing the database centrally provided in the server. Such an updating can occur, for example, automatically at periodic time intervals and/or be initiated by a user. The server can form, for example, a plant asset management system or a vendor asset management system.

Furthermore, it can also be provided that a database is provided in a plant in a number of units (e.g. on different levels relative to the network structure). For example, a database can be provided in one or more field device electrical current supply module(s), in a gateway and in a plant asset management system, wherein, in each case, the databases are updated by accessing a database of a unit in a superordinated level. I.e. for updating, a field device electrical current supply module accesses the gateway, the gateway accesses the plant asset management system and the plant asset management system can, in given cases, access a vendor asset management system. In such case, however, (both relative to the provision of a database as well as relative to the updating) one or more of these stages can also be skipped. Especially, a field device electrical current supply module (to the extent that it is embodied as a wireless adapter) and/or a gateway, for updating its database, can directly communicate wirelessly with a vendor asset management system.

In a further development, the field device electrical current supply module is connected to a communication interface of the field device. If the field device electrical current supply module is embodied as a wireless adapter, then for sending data via the fieldbus these data are sent via the communication interface (wired) to the wireless adapter, which then transmits these data via radio to the target location. Conversely the wireless adapter can receive data via radio and forward the data to the field device via the communication interface.

In a further development, the communication interface is embodied as a fieldbus communication interface and communication via the interface occurs according to the respective fieldbus protocol. In such case, a standardized fieldbus system, such as, for example, Profibus® (see Profibus Profile Specification, Version 3.0) or Foundation® Fieldbus (see Foundation® Specification, Function Block Application Process, Revision EN 1.7) is especially suitable, wherein a fieldbus communication interface according to the HART® standard (see HART® Field Communication Protocol Specifications, Revision 7.0) is preferable due to the frequent application of this fieldbus system and due its good suitability for wireless communication. If the field device electrical current supply module is simultaneously embodied as a wireless adapter, then the wireless communication also preferably occurs according to the respective fieldbus standard, according to which standard the (wired) communication interface of the field device is also embodied. In reference to the wired communication interface of the field device, the field device can be embodied as a 2 conductor device, which means that both the communication as well as the energy supply (or electrical current supply) of the field device occurs via a shared 2 conductor connection. Furthermore, the field device can also be embodied as a 4 conductor device, which means that the communication occurs via a 2 conductor connection and the energy supply of the field device occurs via another 2 conductor connection.

In a further development, the field device electrical current supply module requests a field device type identification from the connected field device in the step of identifying; based on the field device type identification, the particular field device type is unequivocally identifiable.

In a further development, the field device electrical current supply module monitors whether a field device of a new field device type is connected to it and then triggers the method for setting its energy supply parameters it detects that a field device of a new field device type has been connected. Accordingly, it is recognized when a field device is connected to the field device electrical current supply module for the first time. Furthermore, it is recognized when a field device connected to the field device electrical current supply module is replaced by a field device of another field device type. The monitoring can occur, for example, in such a manner that the field device type of the connected field device is queried by the field device electrical current supply module in periodic time intervals. If the system comprising the field device electrical current supply module and field device is only clocked, or operated, in an on state (e.g., only upon a measured value request or an actuation command) and for the rest the time it is in an off state or in a sleep mode (a mode having reduced energy consumption compared to the on state), then it is preferably checked by the field device electrical current supply module whether the same field device type is still connected in the case of each switching to the on state.

In a further development, settings of at least one of the following energy supply parameters of the field device electrical current supply module are stored in the database, respectively, for a plurality of field device types:

a) a start-up voltage, which is to be provided by the field device electrical current supply module during a start-up phase of the respective field device type;

b) a start-up current, which is required by the respective field device type during the start-up phase of the same;

c) a start-up time, during which the start-up voltage is to be provided to the respective field device type by the field device electrical current supply module;

d) an operating voltage, which is to be provided by the field device electrical current supply module during normal operation of the respective field device type after its start-up phase; and/or e) a set-up time period, which gives the time period between a start point in time of normal operation of the field device type and the point in time, at which the field device type delivers a valid measured value.

Depending on the field device type, in such connection, however, other and/or additional operating phases of the field device can be provided with corresponding voltage and electrical current requirements. In corresponding manner, there can also be provided in the field device electrical current supply module other or additional parameters, by which an energy supply of the connected field device during its different operating phases is characterized.

The present invention relates furthermore to a field device electrical current supply module, which has a database, in which parameter settings of at least one energy supply parameter are stored for a number of field device types, and which field device electrical current supply module is embodied in such a manner that the method of the invention can be performed by the field device electrical current supply module. Furthermore, it can also be embodied for the execution of one or more of the further developments explained above.

BRIEF DESCRIPTION OF THE DRAWINGS

Other advantages and utilities of the invention will become evident based on the following descriptions of examples of embodiments in reference to the appended drawing, the figures of which show as follows.

DETAILED DISCUSSION IN CONJUNCTION WITH THE DRAWINGS

Figure 1:
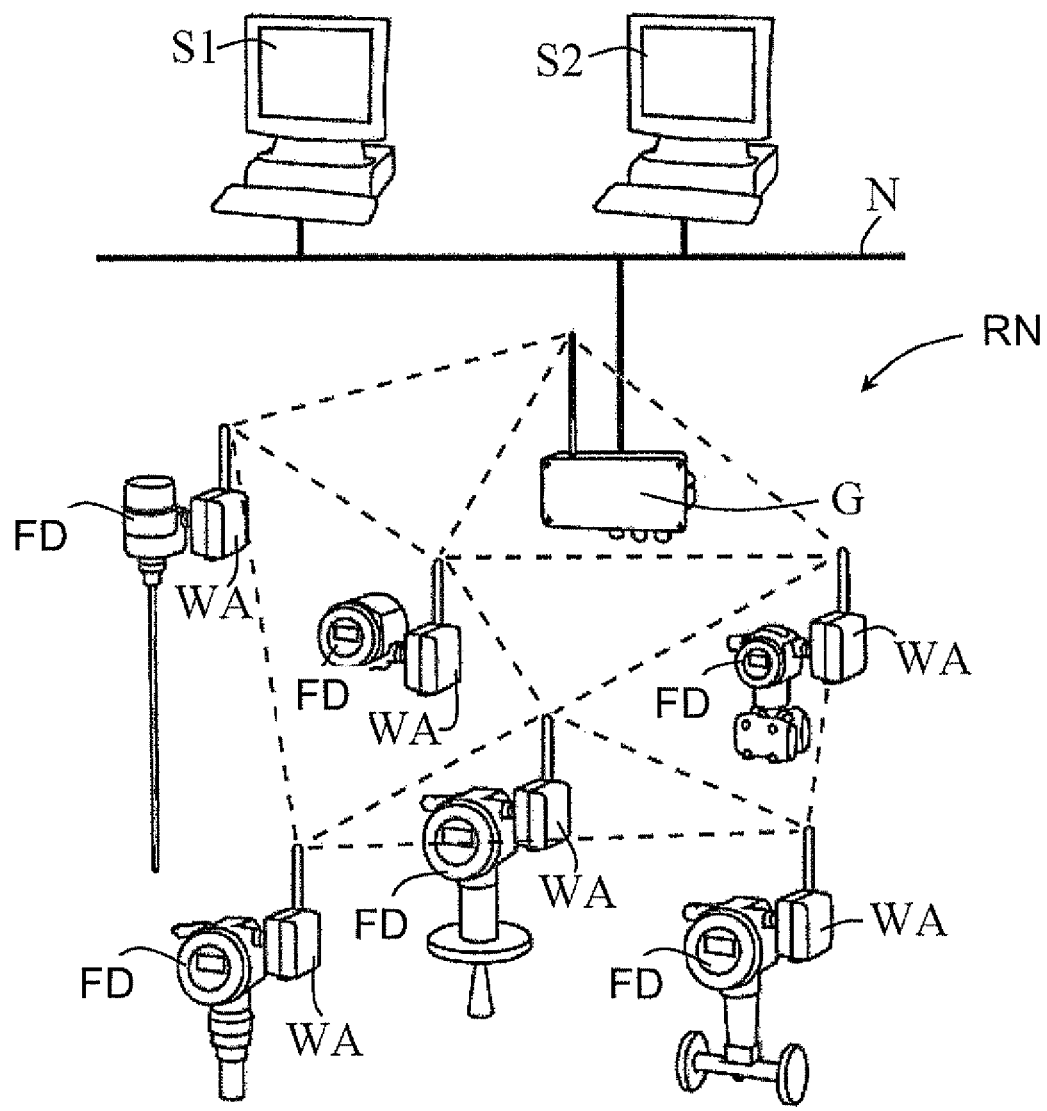
FIG. 1 is a schematic representation of a part of a plant of process automation technology having a radio network.

FIG. 1 shows, schematically, a part of a plant of process automation technology having a radio network RN. Radio network RN includes a number of field devices FD having, in each case, a wireless adapter WA connected thereto. Additionally, radio network RN includes a gateway G. The wireless adapters WA are in radio connection with one another and with gateway G. These radio connections are represented in FIG. 1 by dashed lines. The radio network is embodied according to the wireless HART® standard. In the case of the example of an embodiment illustrated, the gateway (for example, the "Fieldgate" product of Endress+ Hauser) is in communication with two servers S1 and S2 via a wired Ethernet® company network N. The one server S1 forms, at the same time, a superordinated unit, which performs process control with reference to the field devices FD of radio network RN. The other server S2 provides, at the same time, a plant asset management system. Furthermore, server S2 can communicate (for example, via the Internet) with a vendor asset management system (not shown). Furthermore, still more (not shown) servers, fieldbus systems, etc. can also be connected to company network N.

In the illustrated example of an embodiment, the wireless adapters WA contain, in each case, a database, which is stored in a memory of the wireless adapter WA and in which parameter settings of a number of energy supply parameters are stored for a number of field device types. Each wireless adapter WA is embodied, in such case, in such a manner that the method of the invention can be performed with it. To fill this out, reference is made in this connection to the general part of the description and to the following description of the figures. Such a database can also be provided in gateway G, in one or both of the servers S1 and S2 and/or in a vendor asset management system (not shown). As explained above, in such case, a database (e.g. a database of a wireless adapter WA) can be updated by accessing a superordinated (relative to the network structure) database (e.g. a database in the gateway, in server S1 and/or in server S2, and/or in the vendor asset management system).

Figure 2:
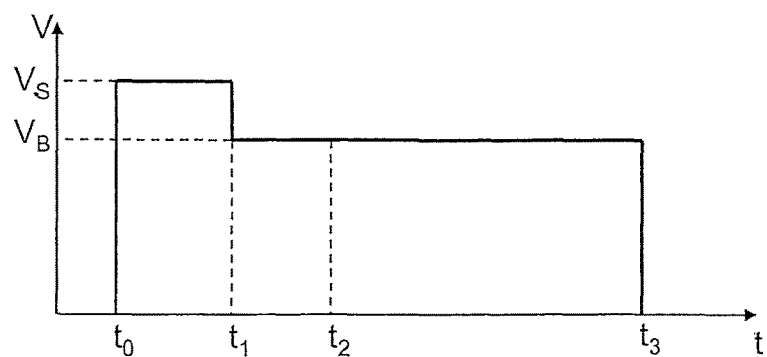
FIG. 2 is a schematic diagram, which shows, by way of example, voltage requirement of a HART® field device as a function of time.

FIG. 2 shows, schematically, voltage V required as a function of time t for a HART® field device, which, as shown in FIG. 1, is supplied with electrical energy by a wireless adapter and which forms a sensor. In the illustrated example of an embodiment, the field device is turned on, clocked for the execution of a measured value request. In the periods of time, in which no measured value request is to be processed by the field device, the system comprising the wireless adapter and field device is switched off.

FIG. 2 shows the field device turned on at time $t_0$. During a start-up phase the field device requires a start-up voltage $V_S$. Furthermore, a certain start-up current is required by the field device, which start-up current can also vary during the start-up phase depending on need (over time). During the start-up phase, for example, capacitors within the field device are charged, self-checks are performed, etc., by the field device. Communication between the field device and the wireless adapter connected to it is, in such case, as a rule, still not possible. In order to be able to provide the required start-up voltage during the start-up phase, the energy supply parameter "start-up voltage" is provided in the wireless adapter; the "start-up voltage" can be set corresponding to the need of the respective field device type. Furthermore, in reference to the start-up phase, the energy supply parameters "start-up current" and "start-up time" are provided in the wireless adapter. For "start-up current", in such case, the maximum electrical current value, which the field device requires during the start-up phase, is input as the parameter setting. The parameter setting of the "start-up current" is, in such case, especially used for the correct setting of the start-up voltage internally in the wireless adapter. The parameter setting "start-up time" gives the time, during which the field device requires the start-up voltage and is accordingly provided by the wireless adapter. In the illustrated example of an embodiment, the start-up phase of the field device is ended at time $t_1$, so that the time period from $t_0$ to $t_1$ is set as the parameter "start-up time".

After the start-up time has passed the field device transfers to normal operation. During normal operation the field device requires an operating voltage $V_O$. In the illustrated example of an embodiment, this is lower than the start-up voltage $V_S$, however, it can also be higher, depending on field device type. In order to be able to provide the required operating voltage during the operating phase, the energy supply parameter "operating voltage" is provided in the wireless adapter; the "operating voltage" can be set correspondingly the need of the respective field device type. In normal operation, communication of the field device is possible via its HART® communication interface. In normal operation, the HART® field device, which in the present example of an embodiment is formed by a 2 conductor-device, can especially be operated in a multidrop mode, in which the electrical current value is set to a fixed electrical current value (e.g. 4 mA), which is as low as possible, and communication via the HART® communication interface occurs exclusively digitally. Alternatively, the HART® field device can be operated, however, in a 4-20 mA mode, in which the electrical current value (in the usual manner), in each case, corresponding to the measured value registered by the field device (to the extent that the field device is a sensor) is set analogly. Additionally, the 4-20 mA signal can be superimposed in the usual manner by a digital signal.

Directly after switching to normal operation, the field device still cannot provide a measured value. For example, the field device still requires time to record one or more measured value(s), perform calculations, etc. The time, which passes after the switching to normal operation (time $t_1$) to the time the field device can provide a measured value (time $t_2$), is referred to as a set-up time period. Depending on the field device type, this time period can last between some seconds and some minutes. For setting this set-up time period, the energy supply parameter "set-up time period" is provided in the wireless adapter; the "set-up time period" can be set corresponding to the respective field device type. The wireless adapter preferably waits for this set-up time period after switching the field device to normal operation before it requests a measured value from the field device. Before then, the wireless adapter can be operated in an energy saving mode so that energy is not consumed unnecessarily. At time $t_3$, the measured value request has been completely executed and the field device is switched back off.

In the following, based on the illustrated schematic block diagram in FIG. 3 and by way of example, a field device 2 and a wireless adapter 4 connected thereto are explained. Field device 2 is again a sensor and is embodied as a 2 conductor device. The system comprising field device 2 and wireless adapter 4 especially forms a system, as is represented in FIG. 1, in each case, by the pairs comprising field device FD and wireless adapter WA.

Field device 2 includes a measured value transducer 6 and a control unit, which is embodied as a microprocessor 8. Furthermore, field device 2 includes a HART® interface 10 in communication with microprocessor 8 via a wired connection. Associated with HART® communication interface 10 is a functional unit 12, which is formed by an ASIC (application specific integrated circuit) and which performs the sending and/or receiving of signals (according to the HART® standard) via HART® communication interface 10. Alternatively to the illustrated connection to wireless adapter 4, field device 2 could be connected to a wired HART fieldbus system via HART® communication interface 10. Furthermore, field device 2 includes a data memory 14 and a display and service unit 16. Furthermore, a service interface 22 is schematically presented on field device 2; in turn, a functional unit 24 in the form of an ASIC is associated with service interface 22.

Wireless adapter 4 likewise includes a control unit in the form of a microprocessor 26. For data exchange via the radio network, microprocessor 26 is connected with a radio unit 28, which has an RF chipset and an antenna 30. Radio unit 28, in such case, is embodied in such a manner that wireless communication occurs according to the wireless HART® standard. Furthermore, microprocessor 26 is connected to a data memory 32. The parameter settings of wireless adapter 4 are stored in data memory 32. Microprocessor 26 can access these parameter settings in order to operate wireless adapter 4 in accordance with the parameter settings. Furthermore, data memory 32 includes a database, in which parameter settings of a number of energy supply parameters for a number of field device types are stored. Wireless adapter 4 includes, furthermore, a display and service unit 33. For communication with field device 2, wireless adapter 4 includes a wired HART® communication interface 34; in turn, a functional unit 36, which performs the sending and/or receiving of signals via the HART® communication interface 34 (according to the HART® standard) is associated with HART® communication interface 34. Functional unit 36, in such case, is formed again by an ASIC. HART® communication interface 10 of field device 2 and HART® communication interface 34 of wireless adapter 4 are connected to one another via a 2 conductor connecting line 38. Via this connection, both the communication between field device 2 and wireless adapter 4 as well as the electrical current supply of the field device 2 by the wireless adapter 4 occur. Thus, a wireless signal transmission for the connected field device 2 can be performed via wireless adapter 4.

For providing the electrical current supply to field device 2 (and wireless adapter 4), wireless adapter 4 includes an electrical current source in the form of a single-use battery 40 and a power supply 42 connected to battery 40. The system components of wireless adapter 4 as well as the system components of field device 2 are supplied with electrical energy (or electrical power) by power supply 42, respectively via electrical current supply lines (not shown) and via the HART® communication interface 34, 2 conductor connecting line 38, HART® communication interface 10 and a power supply 44 of field device 2 connected thereto. In such case, the individual power supplies 42 and 44 can, in each case, also be divided into a number of power supply stages. Power supply 42 of the wireless adapter 4, in such case, is operated by microprocessor 26 in accordance with the parameter settings of the energy supply parameters. An energy supply corresponding to the parameter settings is accordingly provided by power supply 42.

In the following, a form of embodiment of the method of the invention will now be explained with reference to FIG. 3. First, the system comprising field device 2 and wireless adapter 4 is booted using default parameter settings of the energy supply parameters, so that a reliable start-up of the system comprising field device 2 and wireless adapter 4 is enabled. When field device 2 is in normal operation, wireless adapter 4 requests a field device type identification from field device 2 (in a HART® communication), based on which identification the field device type of field device 2 is uniquely identifiable. Based on this field device type identification, wireless adapter 4 identifies the field device type of field device 2. Then, wireless adapter 4 reads the parameter settings of the energy supply parameters "start-up voltage", "start-up current", "start-up time", "operating voltage" and "set-up time period" from the database stored in data memory 32. The parameter settings read out are then loaded into wireless adapter 4 and stored as applicable parameter settings in data memory 32. Data memory 32, in such case, can be divided into a number of memory sections for storing the currently usable parameter settings and for storing the database. In the following (especially in the case of a restart of the system comprising field device 2 and wireless adapter 4, for example, to respond to a new measured value request) wireless adapter 4 is then operated with the parameter settings of the energy supply parameters corresponding to the field device type of connected field device 2.

A field device 2 and a field device electrical current supply module 4' connected thereto will now be explained based on the schematic block diagram illustrated in FIG. 4 by way of example. Primarily, differences compared to the arrangement illustrated in FIG. 3 are explained.

Figure 3:
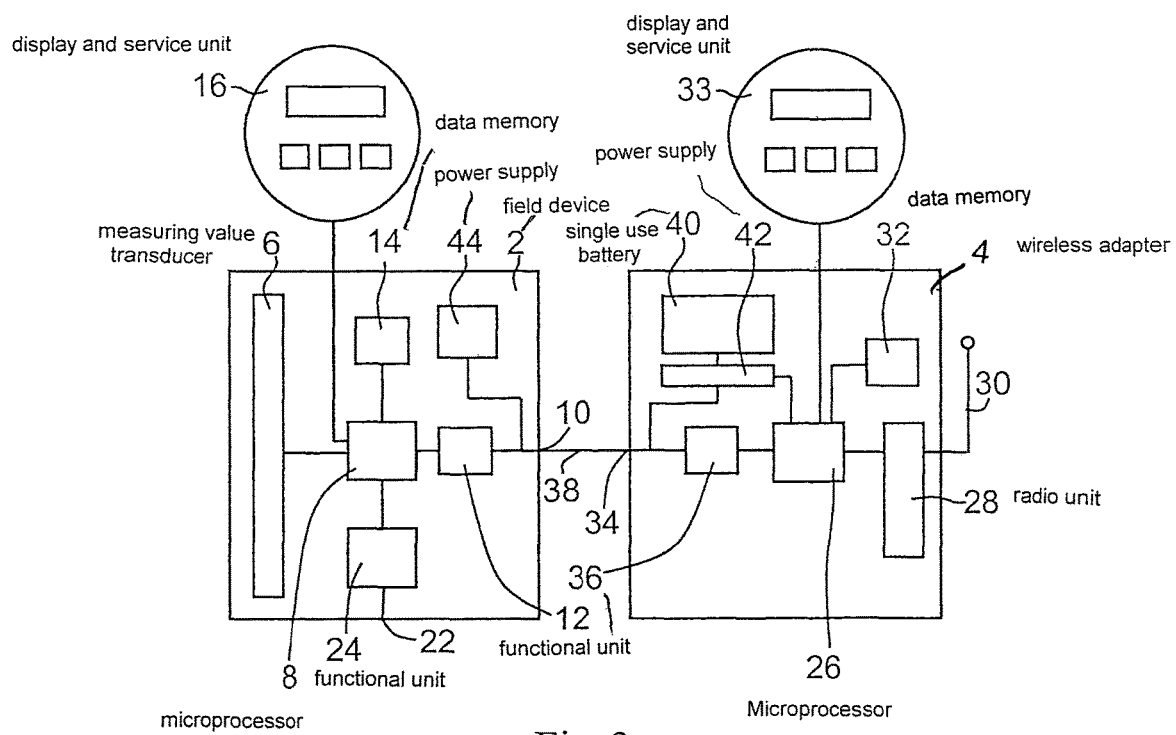
FIG. 3 is a block diagram of a field device and a connected wireless adapter.
Figure 4:
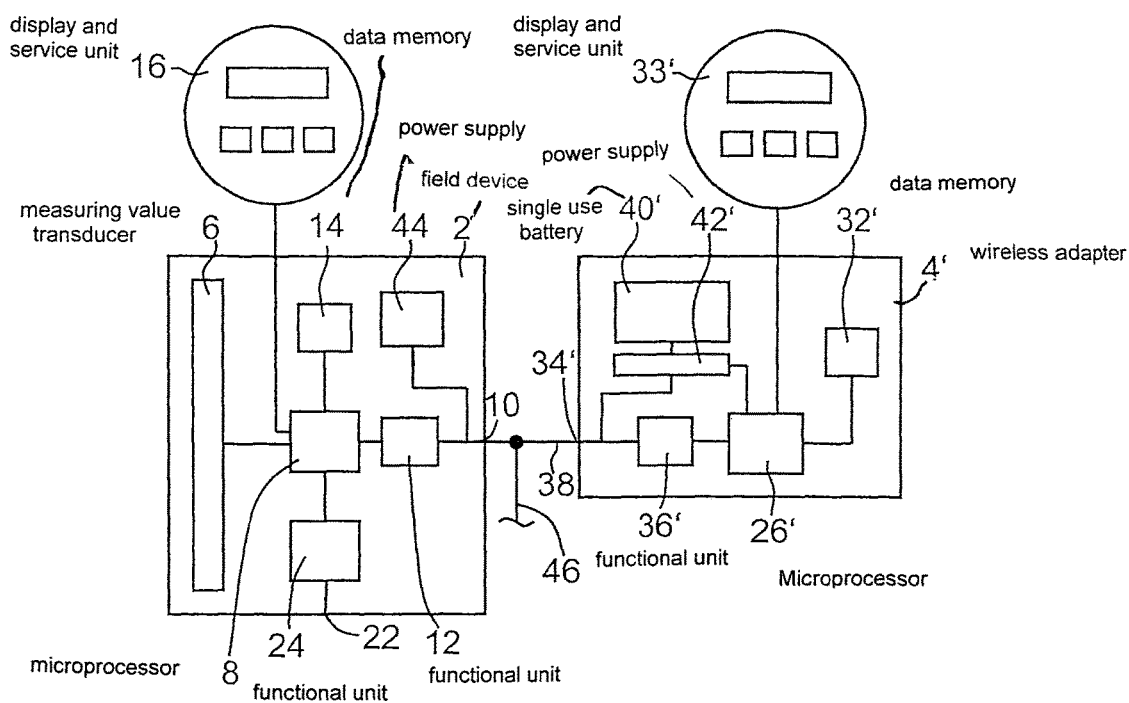
FIG. 4: is a block diagram of a field device and a connected field device electrical current supply module.

Field device 2 is constructed corresponding to field device 2 illustrated in FIG. 3 so that the same reference characters are used. In contrast to wireless adapter 4 of FIG. 3, a wireless signal transmission for field device 2 cannot be performed via field device electrical current supply module 4'. Accordingly, field device electrical current supply module 4' has neither radio unit nor antenna. Also, field device electrical current supply module 4' shown in FIG. 4 is constructed in a manner corresponding to wireless adapter 4 shown in FIG. 3. Especially, it includes a microprocessor 26', a data memory 32', a display and service unit 33', a HART® communication interface 34', a functional unit 36' associated with this, a single-use battery 40' and a power supply 42'. HART® communication interface 10 of field device and HART® communication interface 34' of field device electrical current supply module 4', in turn, are connected to one another via a 2 conductor connecting line 38 so that communication between field device 2 and field device electrical current supply module 4' according to the HART® standard is possible. In order to be able to communicate with a superordinated unit as part of process control, field device 2, via its HART® communication interface 10 in the illustrated example of an embodiment, is furthermore connected by wire to a fieldbus, as represented schematically in FIG. 4 by the branch circuit 46 from 2 conductor connecting line 38. The form of embodiment of the method of the invention explained with reference to FIG. 3 can be implemented in corresponding manner for the arrangement shown in FIG. 4.

The invention claimed is:

1. A method for setting the energy supply parameters of a field device electrical current supply module, which is connected exclusively to one field device, which is used in a plant of process automation, which serves for registering or influencing process variables, which has an electrical energy source or is connected to such an electrical energy source, and through which the one connected field device can be supplied with electrical energy, comprising the steps of:
identifying a field device type of the connected field device by the field device electrical current supply module; and
automatically reading out a parameter setting of at least one energy supply parameter of the field device electrical current supply module from a database, which is provided outside the field device and loading such into the field device electrical current supply module, wherein:
the read out parameter setting is specific to the identified field device type;
the at least one energy supply parameter relates to energy supply of the field device by the field device electrical current supply module;
stored in the database are parameter settings for at least one energy supply parameter for a plurality of field device types;
at least a start-up current as one of said at least one energy supply parameter of the field device electrical current supply module is stored in the database; and
a maximum electrical current value, which the field device requires during a start-up phase, is input as the parameter setting for said start-up current.

2. The method as claimed in claim 1, wherein:
the field device electrical current supply module is formed by a wireless adapter, by which a wireless signal transmission for the connected field device can be performed.

3. The method as claimed in claim 1, wherein:
the field device electrical current supply module has at least one autarkic electrical current source, especially a single-use battery, a rechargeable battery and/or a solar cell.

4. The method as claimed in claim 1, wherein:
the database is provided in a communication unit, which is in communication with the field device electrical current supply module.

5. The method as claimed in claim 2, wherein:
the database is provided in a gateway, the gateway is in wireless communication with the field device electrical current supply module and enables a communication with a superordinated network and/or a superordinated computer unit.

6. The method as claimed in claim 1, wherein:
the field device electrical current supply module has the database.

7. The method as claimed in claim 1, wherein:
said step of automatically reading out of the setting of at least one energy supply parameter of the field device electrical current supply module from the database is performed by the field device electrical current supply module.

8. The method as claimed in claim 1, wherein:
the database is provided in a configuration unit, through which parameters of the field device electrical current supply module can be set, and/or in a communication unit in communication with the configuration unit.

9. The method as claimed in claim 8, wherein:
said step of automatically reading out the parameter setting of at least one energy supply parameter of the field device electrical current supply module from the database is performed by the configuration unit.

10. The method as claimed in claim 1, wherein:
a database, in which the parameter settings of at least one energy supply parameter for a number of field device types are stored, is centrally provided in a server and that at least one database, which is provided:
a) in the field device electrical current supply module;
b) in a communication unit, which is in communication with the field device electrical current supply module;
c) in a configuration unit, by which parameters of the field device electrical current supply module can be set; and/or
d) in a communication unit, which is in communication with the configuration unit, is updated by accessing the database provided in the server.

11. The method as claimed in claim 1, wherein:
the field device electrical current supply module is connected to a communication interface of the field device.

12. The method as claimed in claim 11, wherein:
the field device electrical current supply module, in said step of identifying, requests from the connected field device a field device type identification, based on which the particular field device type can be uniquely identified.

13. The method as claimed in claim 11, wherein:
communication between the field device and the field device electrical current supply module occurs according to the HART® protocol.

14. The method as claimed in claim 1, wherein:
the field device electrical current supply module monitors whether a field device of a new field device type is connected to it; and the method for setting energy supply parameters of the field device electrical current supply module is then initiated by such when it detects that a field device of a new field device type has been connected.

15. The method as claimed in claim 1, wherein:
settings of at least one of the following energy supply parameters of the field device electrical current supply module are stored in the database, respectively, for a plurality of field device types:
a) a start-up voltage, which is to be provided by the field device electrical current supply module during a start-up phase of the respective field device type;
b) a start-up current, which is required by the respective field device type during the start-up phase of the same;
c) a start-up time, during which the start-up voltage for the respective field device type is to be provided by the field device electrical current supply module;

d) an operating voltage, which is to be provided by the field device electrical current supply module during normal operation of the respective field device type after its start-up phase; and/or
e) a set-up time period, which gives the time period between a start point in time of normal operation of the field device type and the point in time, at which the field device type delivers a valid measured value.

\* \* \* \* \*